(12) United States Patent
Lee et al.

(10) Patent No.: US 11,017,278 B2
(45) Date of Patent: May 25, 2021

(54) METHOD OF OPTIMIZING PRINTING

(71) Applicant: QBIT SEMICONDUCTOR LTD., Taipei (TW)

(72) Inventors: Sung-Chu Lee, Taipei (TW); Pin-Hua Tien, Taipei (TW)

(73) Assignee: QBIT SEMICONDUCTOR LTD., Taipei (TW)

( * ) Notice: Subject to any disclaimer, the term of this patent is extended or adjusted under 35 U.S.C. 154(b) by 0 days.

(21) Appl. No.: 16/833,645

(22) Filed: Mar. 29, 2020

(65) Prior Publication Data

US 2020/0401860 A1 Dec. 24, 2020

(30) Foreign Application Priority Data

Jun. 19, 2019 (TW) .................................. 108121177

(51) Int. Cl.

| G06K 15/00 | (2006.01) |
|---|---|
| G06K 15/02 | (2006.01) |
| G06K 9/46 | (2006.01) |
| H04N 1/409 | (2006.01) |
| G06T 5/00 | (2006.01) |
| H04N 1/58 | (2006.01) |

(52) U.S. Cl.
CPC ........ G06K 15/1872 (2013.01); G06K 9/4604 (2013.01); G06T 5/002 (2013.01); G06T 5/003 (2013.01); G06T 2207/20192 (2013.01); H04N 1/4092 (2013.01); H04N 1/58 (2013.01)

(58) Field of Classification Search
None
See application file for complete search history.

(56) References Cited

U.S. PATENT DOCUMENTS

| 9,973,654 | B1 * | 5/2018 | Subbaian | H04N 1/4092 |
|---|---|---|---|---|
| 10,419,640 | B1 * | 9/2019 | Palanivel | H04N 1/4092 |
| 2005/0265624 | A1 * | 12/2005 | Washio | H04N 1/4055 |
| | | | | 382/273 |
| 2010/0046856 | A1 * | 2/2010 | Bai | G06T 5/002 |
| | | | | 382/293 |
| 2015/0352871 | A1 * | 12/2015 | Puigardeu Aramendia | |
| | | | | G06K 15/105 |
| | | | | 347/3 |

FOREIGN PATENT DOCUMENTS

| CN | 104182764 A | 12/2014 |
|---|---|---|
| TW | 201914310 A | 4/2019 |

OTHER PUBLICATIONS

Office Action dated Apr. 28, 2020 of the corresponding Taiwan patent application.

* cited by examiner

*Primary Examiner* — Dung D Tran
(74) *Attorney, Agent, or Firm* — Chun-Ming Shih; HDLS IPR Services

(57) ABSTRACT

A method of optimizing printing is applied to a printing apparatus and has following steps of retrieving an input image, executing a tagging process on the input image for tagging one of an edge tag, a fuzzy tag, and a photo tag on each sub-image of the input image, executing the different printing converting process on each sub-image according to its tag for obtaining a printable image, and printing according to the printable image. The present disclosed example can deepen the object edges in the image being printed, improving the image quality of non-edge regions, and improving the printing quality.

12 Claims, 12 Drawing Sheets
(4 of 12 Drawing Sheet(s) Filed in Color)

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

FIG.7

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0, 1 | 2 | 2 | 2 | 2 | 2 | 2 | 2 |
| 0,1 | 2 | 2 | 2 | 2 | 2 | 2 | 2 |
| 1 | 2 | 1,2 | 1,2 | 1,2 | 1,2 | 1,2 | 1,2 |
| 1 |  |  |  |  |  |  |  |
| 1 | 1 | 1 | 1 | 1 | 1 | 1 | 1 |
| 1 | 1 | 1 | 1 | 1 | 1 | 1 | 1 |

FIG.8

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 2 | 2 | 2 | 2 | 2 | 2 | 2 |
| 0 | 2 | 2 | 2 | 2 | 2 | 2 | 2 |
| 1 | 2 | 1 | 1 | 1 | 1 | 1 | 1 |
| 1 | 3 | 3 | 3 | 3 | 3 | 3 | 3 |
| 1 | 1 | 1 | 1 | 1 | 1 | 1 | 1 |
| 1 | 1 | 1 | 1 | 1 | 1 | 1 | 1 |

FIG.9

METHOD OF OPTIMIZING PRINTING

BACKGROUND OF THE INVENTION

Field of the Invention

The technical field of the present disclosed example relates to printing and more particularly related to a method of optimizing printing.

Description of Related Art

The conventional 2D printing technologies are to execute the same printing converting process on all of the different portions of each of the input images, such as using the same way to convert color space into printing color space or the same way to halftone.

However, the input image usually comprises a plurality of types of sub-images, such as edges of an object, inside of the object, photo background and so forth. The visual characteristics of the above types will become unclear caused by the conventional 2D printing technologies using the same printing converting process on the different types of sub-images, and the printing quality is reduced dramatically. For example, edges of the object will be concealed when the printing converting process for smoothing is used, and inside of the object or the photo background will be too deep when the printing converting process for sharpening is used.

Thus, the conventional 2D printing technologies have the above-mentioned problems of disabling from emphasizing the visual characteristics of the types of each sub-image simultaneously, and there is a need for a more effective solution.

SUMMARY OF THE INVENTION

The disclosure is directed to a method of optimizing printing, the method has an ability to execute the suitable printing converting process on each part of the input image according to the type of each part.

One of the exemplary embodiments, a method of optimizing printing, comprises following steps of retrieving an input image; executing a tagging process on the input image for setting a tag on each sub-image of the input image, wherein the tagging process is used to set an edge tag on the sub-image belonging to edge image, set a fuzzy tag on the sub-image belonging to fuzzy region, and set a photo tag on the sub-image belonging to photo region; executing a plurality of different printing converting processes on the sub-images based on the tag of each of the sub-images for converting the input image into a printable image, wherein the printing converting processes comprises a converting process of emphasizing edges for each sub-image with the edge tag, a fuzzy converting process for each sub-image with the fuzzy tag, and a converting process of smoothing for each sub-image with the photo tag; and, controlling a printing apparatus to print based on the printable image.

The present disclosed example can deepen the object edges in the image being printed, improving the image quality of non-edge regions, and improving the printing quality.

BRIEF DESCRIPTION OF DRAWING

The file of this application contains drawings executed in color. Copies of this patent or patent application publication with color drawing(s) will be provided by the Office upon request and payment of the necessary fee. As the color drawings are being filed electronically via EFS-Web, only one set of the drawings is submitted.

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

FIG. 7 is a first schematic view of a tagging process of one embodiment of the present disclosed example;

FIG. 8 is a second schematic view of a tagging process of one embodiment of the present disclosed example;

FIG. 9 is a third schematic view of a tagging process of one embodiment of the present disclosed example;

DETAILED DESCRIPTION OF THE INVENTION

In cooperation with attached drawings, the technical contents and detailed description of the present disclosed example are described thereinafter according to a preferable embodiment, being not used to limit its executing scope. Any equivalent variation and modification made according to appended claims is all covered by the claims claimed by the present disclosed example.

Figure 1:
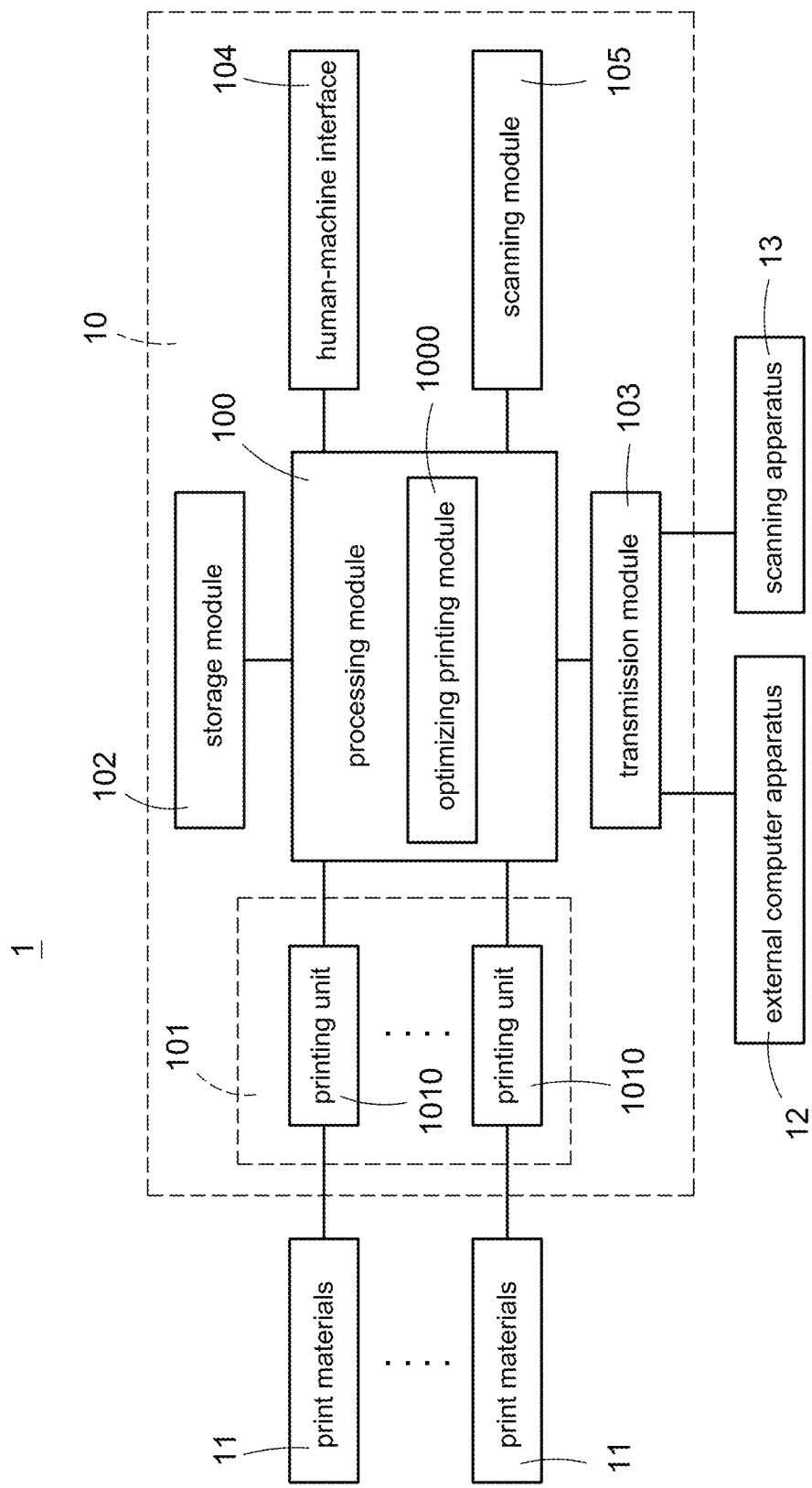
FIG. 1 is an architecture diagram of a print system of one embodiment of the present disclosed example.

Please refer to FIG. 1, which is an architecture diagram of a print system of one embodiment of the present disclosed examples. A method of optimizing printing is provided by the present disclosed example, and the method is mainly applied to a print system 1 shown in FIG. 1. The method of optimizing printing of the present disclosed example has the ability to analyze the type of each part of the input image (such as recognizing that it is edge or smooth region), configure tag on each part according to the type, and respectively execute the different printing converting processes on the different parts of the input image according to the tag of each part for emphasizing the visual characteristics of the different types of the parts (such as deepening the edges or reducing the color variation), so as to improve the print quality.

More specifically, the print system 1 mainly comprises a printing apparatus 10, such as monochrome or color inkjet printer, monochrome or color laser printer and so forth. The printing apparatus 10 mainly comprises a printing module 101, a storage module 102 and a processing module 100 electrically connected to the above elements.

The printing module 101 comprises one or more printing unit(s), and FIG. 1 takes a plurality of printing units 1010 for example. Each printing unit 1010 is respectively connected to providers of the print materials 11 with different colors (such as Cyan, Magenta, Yellow and Black). One of the exemplary embodiments, the printing module 101 further comprises a driving module (not shown in figures) electrically connected to the processing module 100. The driving module is used to be controlled to drive each printing unit 1010 to move (in the X-Y plane) for printing at the different printing positions.

One of the exemplary embodiments, the printing module 101 is a laser printing module, and each printing unit 1010 is used to lay the toner for printing (namely, the print materials 11) with the different color.

One of the exemplary embodiments, the printing module 101 is an inkjet printing module, and each printing unit 1010 is a nozzle for the different color and connected to an ink cartridge accommodating the inks of the different color (namely, the print materials 11).

The storage module 102 is used to store data (such as the various images and parameters described later). The processing module 100, such as processor, MCU, FPGA, SoC and so forth, is used to control the printing apparatus 10.

One of the exemplary embodiments, the storage module 102 may comprise a non-transient storage media, and the non-transient storage media stores a computer program (such as application program or firmware of the printing apparatus 10). A plurality of computer readable codes are recorded in the computer program. The processing unit 10 may further implement the method of each embodiment of the present disclosed example via the execution of the computer-executable codes by the processing module 100.

One of the exemplary embodiments, the processing module 100 comprises an optimization unit 1000, such as system on a chip (Soc) or special purpose chip module. The optimization unit 1000 may be used to control the printing apparatus 10 to implement the method of each embodiment of the present disclosed example. The present disclosed example may reduce the load on the main processor via using the exclusive control hardware to execute the optimizing printing, so as to improve the effectiveness of printing and processing.

One of the exemplary embodiments, the printing apparatus 10 further comprises a transmission module 103 electrically connected to the processing module 100, such as USB module, Ethernet module, Wi-Fi module or Bluetooth module. The transmission module 103 is used to connect to the external computer apparatus 12, such as cloud server, personal computer, notebook, tablet, smartphone, or the other computer apparatuses, the scanning apparatus 13 (for example, the color/monochrome scanner, the scanning apparatus 13 may be also connected to the transmission module 103 by the computer apparatus 12), camera or the other external image capture apparatus, the flash drive, the external hard drive or the other storage apparatus. Data may be transmitted between the transmission module 103 and the external computer apparatus 12. For example, the transmission module 103 may receive the input images or parameters described later from the external computer apparatus 12.

One of the exemplary embodiments, the printing apparatus 10 further comprises a human-machine interface 104 (such as buttons, a monitor, indicators, a buzzer, or any combination of above elements) electrically connected to the processing module 100. The human-machine interface 104 is used to receive the user operations and output the information related to the printing.

One of the exemplary embodiments, the printing apparatus 10 is a multi-function printer, and further comprises a scanning module 105 electrically connected to the processing module 100. The scanning module 105 is used to scan the external objects (such as paper) and generate the corresponding input images (such as gray-scale images or color images).

Furthermore, when the user operates the human-machine interface 104 to operate the copy function, the printing apparatus 10 may obtain the input image of the document by the scanning module 105, execute the following method of optimizing printing on the input image for obtaining the printable image with high quality, and control the printing module 101 to print the copy document with high quality based on the printable image.

Please be noted that the following description takes executing the optimizing printing at the printing apparatus 10 for example, but this specific example is not intended to limit the scope of the present disclosed example.

One of the exemplary embodiments, the external computer apparatus 12 stores a printing software (such as the application program for PC-end of the printing apparatus 10), the external computer apparatus 12 may execute the printing software to implement the method of each embodiment of the present disclosed example, and transfer the generated printable image to the printing apparatus 10 for printing. Please be noted that because the external computer apparatus 12 is usually with the higher-level processors, this embodiment can effectively improve the effectiveness of the execution of optimizing printing.

Figure 2:
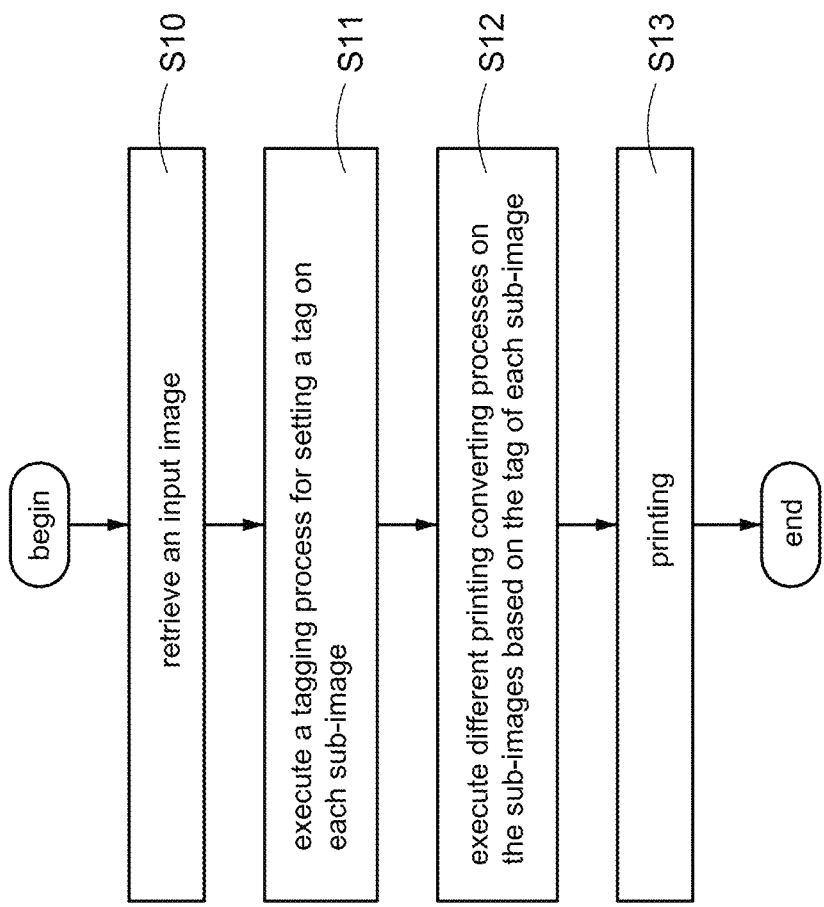
FIG. 2 is a flowchart of a method of optimizing printing of a first embodiment of the present disclosed example.

Please refer to FIG. 1 and FIG. 2 together. FIG. 2 is a flowchart of a method of optimizing printing of a first embodiment of the present disclosed example. The method of optimizing printing of this embodiment may be used to the color printing or monochrome printing, but this specific example is not intended to limit the scope of the present disclosed example. More specifically, the method of optimizing printing of this embodiment mainly comprises following steps.

Step S10: the processing module 100 retrieves an input image.

One of the exemplary embodiments, the above-mentioned input image may be stored in the storage module 102, be received from the external computer apparatus 12, or be obtained by using the scanning module 105 or the scanning apparatus 13 to scan, but this specific example is not intended to limit the scope of the present disclosed example.

One of the exemplary embodiments, the above-mentioned input image may be the gray-scale image when applying to the monochrome printing or the color image when applying to the color printing, such as RGB color image.

Step S11: the processing module 100 executes a tagging process on the input image for setting a tag on each sub-image of the input image.

More specifically, the processing module 100 divides the input image into a plurality of sub-images, and analyzes each sub-image for determining the image type of each sub-image, and configure the virtual tag on each sub-image based on its image type being determined. Each of the sub-images may be a single-pixel or the image block composed of a plurality of adjacent pixels. Furthermore, the sizes of the above-mentioned sub-images may be the same as each other or be different from each other, but this specific example is not intended to limit the scope of the present disclosed example.

One of the exemplary embodiments, the tagging process is to determine whether each sub-image comprises any edge of any object (for example, the edge detection algorithm may be used for the determination), and whether each sub-image corresponds to the region near the edge (namely, the fuzzy region, range of the fuzzy region may be determined based on the distances from the edge) or the smooth region (namely, the photo region, range of the photo region may be determined based on the range of the edges and the fuzzy region, or by executing an image analysis on the sub-image, such as image spectrum analysis). The sharpness of the above-mentioned fuzzy region is between the sharpness of the edge and the sharpness of the photo region. Namely, this embodiment has the ability to classify the sub-images based on the image sharpness.

When any of the sub-image belongs to the edges, an edge tag will be configured on this sub-image; when any of the sub-image belongs to the fuzzy region, a fuzzy tag will be configured on this sub-image; when any of the sub-image belongs to the photo region, a photo tag will be configured on this sub-image.

One of the exemplary embodiments, the tagging process determines that one of the sub-images belongs to the edge and configures an edge tag on this sub-image when this sub-image has a bias dark in brightness and a high sharpness edge. The computation of sharpness is the common technology in the technical field of image processing, and the relevant description is omitted for brevity.

Figure 10:
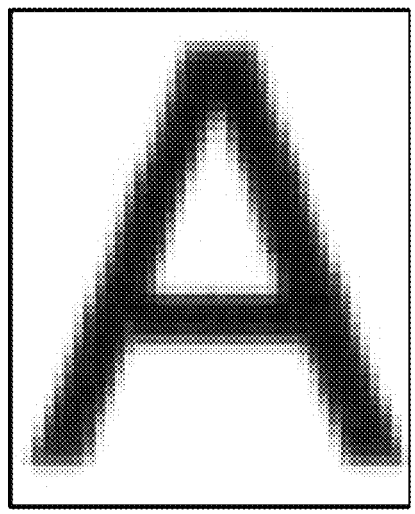
FIG. 10 is a schematic view of an input image as an example.
Figure 11:
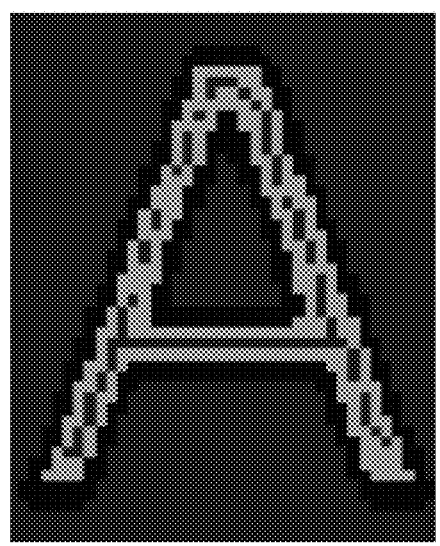
FIG. 11 is a schematic view of a result of executing a tagging process on FIG. 10 and marking according to the tag types.

For example, please refer to FIG. 10 and FIG. 11 together. FIG. 10 is a schematic view of an input image (RGB color image) as an example, and FIG. 11 is a schematic view of a result of executing a tagging process on FIG. 10 and marking according to the tag types.

In the example shown in FIG. 11, the sub-image being configured the edge tag is indicated in black, the sub-image being configured the edge tag is indicated in green, and the sub-image being configured the photo tag is indicated in blue.

FIG. 11 is clearly shown that after the process provided by the present disclosed example, it will determine that the contours of the letter "A" with the highest sharpness are the edges, the regions close to the contour with the secondly highest sharpness are the fuzzy regions, and the other regions being smooth with the lowest sharpness are the photo regions. Thus, this embodiment can classify the sub-images correctly.

Step S12: the processing module 100 executes a plurality of different printing converting processes on each of the sub-images based on the tag of each of the sub-images for converting each of the sub-images into a printable sub-image. Furthermore, all of the printable sub-images can be combined to a printable image.

One of the exemplary embodiments, the above-mentioned printing converting processes may comprise three different processes respectively corresponding to the three above-mentioned tags, and they are converting process of emphasizing edges, fuzzy converting process, and converting process of smoothing.

One of the exemplary embodiments, the above-mentioned converting process of emphasizing edges can make the generated printable sub-images have deeper edges. The above-mentioned converting process of emphasizing edges may comprise the high-pass filtering process, the sharpening process, the error diffusion method and so forth. The above-mentioned fuzzy converting process can make the generated printable sub-images have medium sharpness. The above-mentioned fuzzy converting process may comprise the band-pass filtering process, the ordered dithering process and so forth. The above-mentioned converting process of smoothing can make the variation (such as pixel values) of the generated printable sub-images smoother. The above-mentioned converting process of smoothing may comprise the low-pass filtering process, the ordered dithering process and so forth.

One of the exemplary embodiments, the processing module 100 executes the converting process of emphasizing edges on each sub-image with the edge tag, executes the fuzzy converting process on each sub-image with the fuzzy tag, and executes the converting process of smoothing on each sub-image with the photo tag.

Thus, the present disclosed example can execute the different processes respectively on the sub-images of the same input image based on the type of each sub-image, and make the outputted image have the higher image quality.

Step S13: the processing module 100 controls the processing module 101 to print based on the printable image.

One of the exemplary embodiments, taking monochrome printing for example, the above-mentioned printable image is single halftone image, and the processing module 100 controls the single printing unit 1010 to print according to the position and the pixel value of each pixel of the halftone image. For example, the positions corresponding to the pixel value "1" won't be printed, and only the positions corresponding to the pixel value "0" will be printed.

One of the exemplary embodiments, taking multiple-color printing or full-color printing for example, the above-mentioned printable image comprises a plurality of the different colors of halftone images, and the processing module 100 controls each printing unit 1010 corresponding to the same color as the halftone image to print according to the position and the pixel value of each pixel of the halftone image corresponding to the same color as the printing unit 1010. For example, the positions corresponding to the pixel value "1" won't be printed, and only the positions corresponding to the pixel value "0" will be printed. Thus, the present disclosed can implement multiple-color printing and full-color printing by stacking up the different colors of print materials.

The present disclosed example can deepen the object edges in the image being printed, improving the image quality of non-edge regions, and improving the printing quality.

Figure 3:
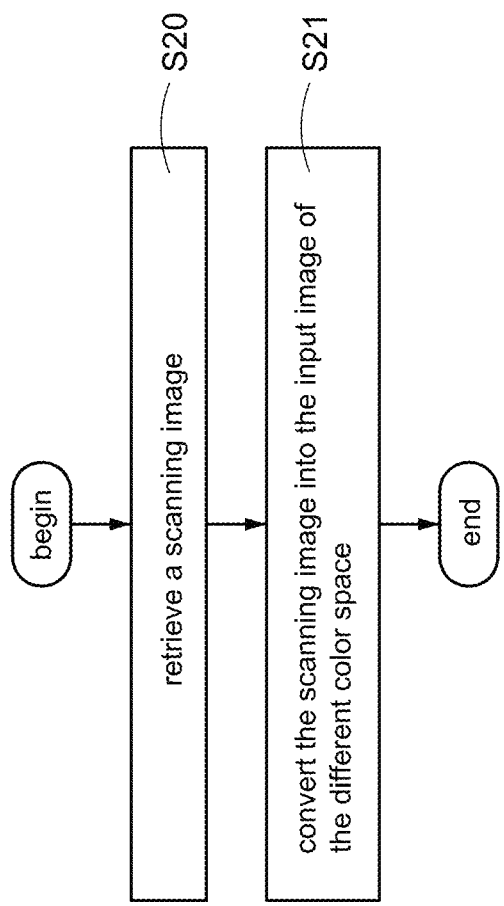
FIG. 3 is a flowchart of a scanning process of a second embodiment of the present disclosed example.

Please refer to FIG. 1 to FIG. 3 together, and FIG. 3 is a flowchart of a scanning process of a second embodiment of the present disclosed example. In this embodiment, the input image is obtained by scanning the external document. In comparison with the method of optimizing printing shown in FIG. 2, the step S10 of the method of optimizing printing of this embodiment comprises following steps.

Step S20: the processing module 100 scans the document by the scanning module 105 for obtaining the scanning image.

One of the exemplary embodiments, taking gray-scale scanning for example, the above-mentioned scanning image may be a gray-scale image.

One of the exemplary embodiments, taking color scanning for example, the above-mentioned scanning image may be a color image in the RGB color space (or the other color space).

Step S21: the processing module 100 executes a process of converting color space on the scanning image for transferring the scanning image into the input image in the different color space.

One of the exemplary embodiments, the above-mentioned process of converting color space is configured to transfer the color space of the scanning image from the RGB color space into the YCrCb color space, but this specific example is not intended to limit the scope of the present disclosed example.

One of the exemplary embodiments, the above-mentioned process of converting color space is configured to transfer the color space of the scanning image into YUV color space.

Please be noted that it is convenient to obtain brightness and gray value of the input image when the input image is in the YCrCb color space or the YUV color space, so the present disclosed example can reduce the computation of the tagging process drastically, and improve the process efficiency substantially.

Please be noted that although the scanning image is obtained by the scanning module 105 in this embodiment, but this specific example is not intended to limit the scope of the present disclosed example.

One of the exemplary embodiments, the processing module may directly retrieve the scanning image from the external scanning apparatus 13, or, retrieve the scanning image scanned by the scanning apparatus 13 from the external computer apparatus 12.

Figure 4:
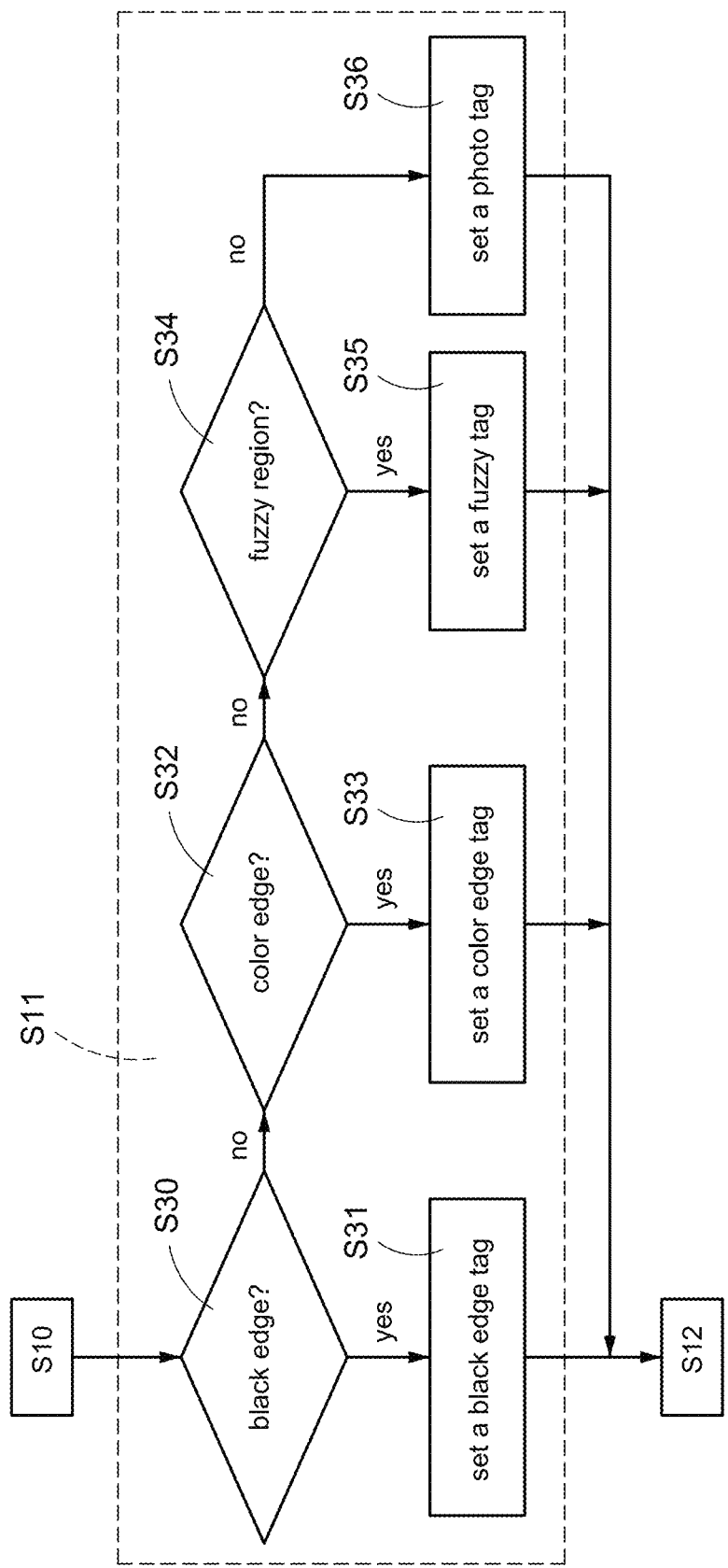
FIG. 4 is a flowchart of a tagging process of a third embodiment of the present disclosed example.

Please refer to FIG. 1, FIG. 2 and FIG. 4, and FIG. 4 is a flowchart of a tagging process of a third embodiment of the present disclosed example. This embodiment is applied to color printing, and provides four tags being black edge tag, color edge tag, fuzzy tag, and photo tag. Namely. this embodiment is configured to classify each of the sub-images into one of the black edges, color edge, fuzzy region and photo region.

Furthermore, in this embodiment, the priority of the black edge tag is the first (highest), the priority of the color edge tag is the second, the priority of the fuzzy tag is the third, and the priority of the photo tag is the fourth (lowest). On the other hand, when any sub-image matches with a plurality of the conditions of the tags simultaneously (such as the black edge tag and the color edge tag), this embodiment configures each sub-image to have only one tag based on the above-mentioned priority (such as the black edge tag).

Please be noted that the above-mentioned priority is not used to limit the executing scope of the present disclosed example. The person skilled in the art of the present disclosed example may modify the above-mentioned priority (such as configuring the priority of the color tag to be the first and highest) based on demand after referring to the present disclosed example.

More specifically, in comparison with the method of optimizing printing shown in FIG. 2, in the execution of step S11 of this embodiment, the processing module 100 executes following steps on all of the sub-images of the input image.

Step S30: the processing module 100 determines whether the sub-image belongs to the black edge.

One of the exemplary embodiments, the processing module 100 determines that the sub-image belongs to the black edge when the sub-image has a bias dark in brightness, a bias gray in color density, a bright spot, and a high sharpness edge.

One of the exemplary embodiments, the input image is YCrCb image (namely, each pixel has the pixel values of a brightness value, a red component, and a blue component). The processing module 100 may determine whether the sub-image has a bias dark and any bright spot based on the brightness value of each pixel of each sub-image, the sub-image has a bias gray in color density based on the red component and the blue component of each pixel of each sub-image, and the sub-image has a high sharpness edge based on the pixels of the sub-image and/or the other adjacent sub-images.

If the processing module 100 determines that the sub-image belongs to the black edge, the processing module 100 performs step S31: the processing module 100 configuring the black edge tag on the sub-image belongs to the black edge.

If the processing module 100 determines that the sub-image does not belong to the black edge, the processing module 100 performs step S32: the processing module 100 determining whether the sub-image belongs to the color edge.

One of the exemplary embodiments, the processing module 100 determines that the sub-image belongs to the color edge when the sub-image has the bias dark in brightness and the high sharpness edge. The above-mentioned determinations of brightness and sharpness may be the same as or similar to the determination of the black edge, the relevant description is omitted for brevity.

If the processing module 100 determines that the sub-image belongs to the color edge, the processing module 100 performs step S33: the processing module 100 configuring the color edge tag on the sub-image belonging to the color edge.

If the processing module 100 determines that the sub-image does not belong to the color edge, the processing module 100 performs step S34: the processing module 100 determines whether the sub-image belongs to the fuzzy region.

One of the exemplary embodiments, the processing module 100 determines that the sub-image belongs to the fuzzy region when the sub-image has the bias dark in brightness, the bias gray in color density, and a middle sharpness edge. The above-mentioned determinations of brightness, color density and sharpness may be the same as or similar to the determination of the black edge, the relevant description is omitted for brevity.

If the processing module 100 determines that the sub-image belongs to the fuzzy region, the processing module 100 performs step S35: the processing module 100 configuring the fuzzy tag on the sub-image belonging to the fuzzy region.

If the processing module 100 determines that the sub-image does not belong to the fuzzy region, the processing module 100 performs step S36: the processing module 100 directly determining that the sub-image belongs to the photo region and configuring the photo tag on the sub-image belonging to the photo region when the sub-image belongs to none of the black edge, the color edge and the fuzzy region.

Thus, the present disclosed example can configure the correct tag on each sub-image.

Figure 12:
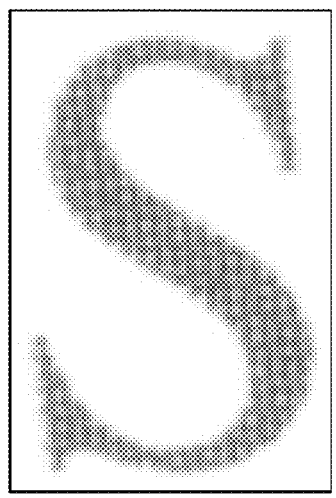
FIG. 12 is a schematic view of an input image as another example.
Figure 13:
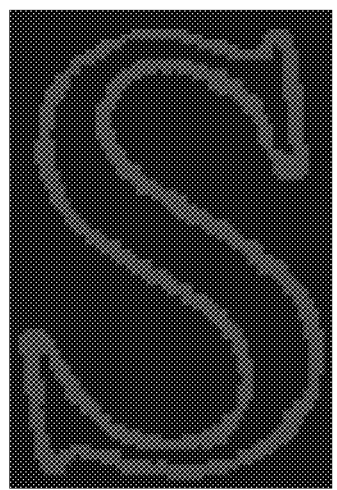
FIG. 13 is a schematic view of a result of executing a tagging process on FIG. 12 and marking according to the tag types.

Please refer to FIG. 12 and FIG. 13 together, FIG. 12 is a schematic view of an input image (RGB color image) as another example, and FIG. 13 is a schematic view of a result of executing a tagging process on FIG. 12 and marking according to the tag types.

In FIG. 13, the sub-images with the black edge tag are indicated in black, the sub-images with the color edge tag are indicated in red, the sub-images with the fuzzy tag are indicated in green, and the sub-images with the photo tag are indicated in blue.

FIG. 13 has clearly shown that after the process provided by the present disclosed example, it will determine that the contours of the letter "S" being color and with the highest sharpness are the color edges, the regions close to the contours are the photo region because there is not an obvious edge in the region closed to the contours and the region looks smooth, and the other regions are also the photo region.

Figure 5:
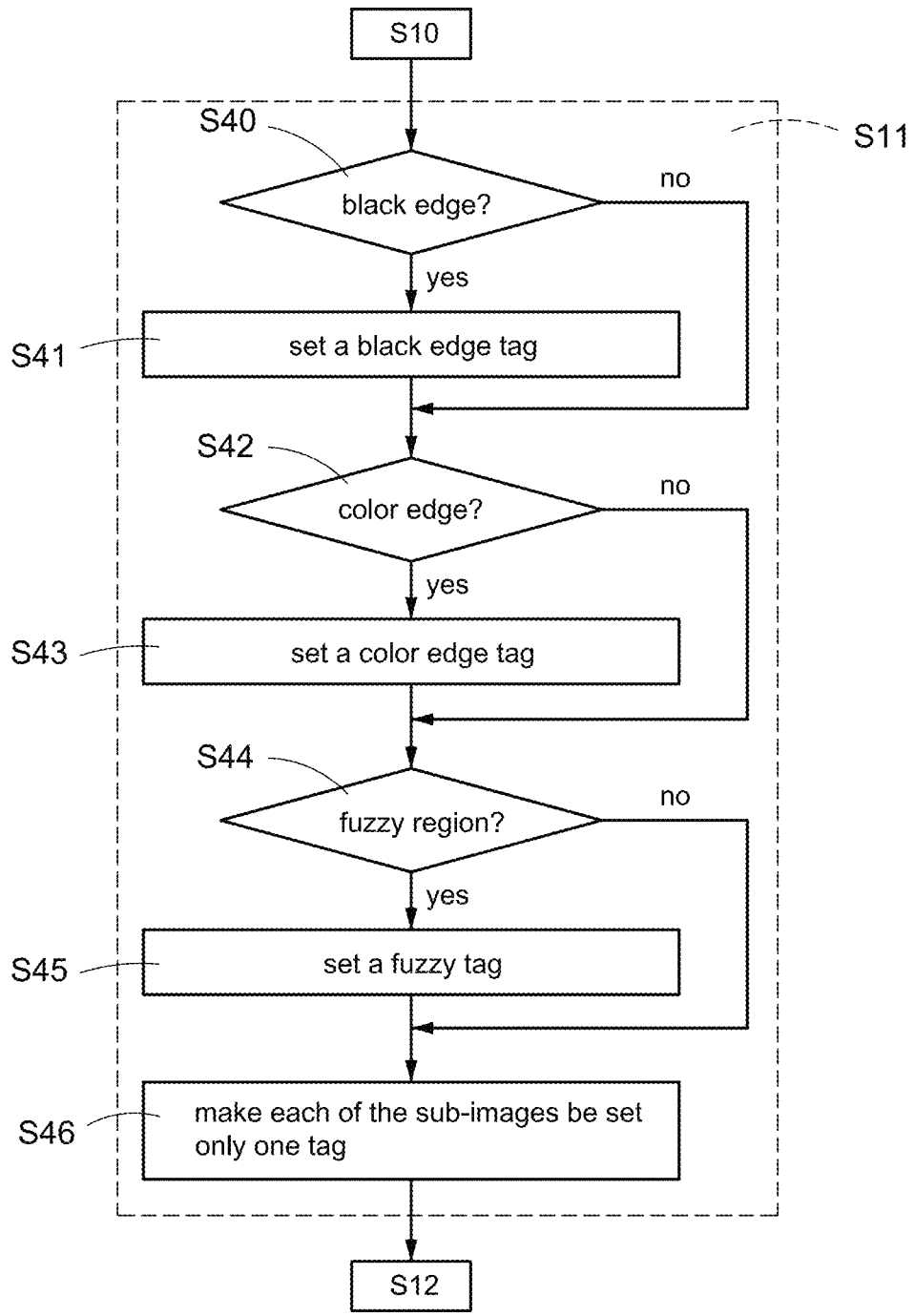
FIG. 5 is a flowchart of a tagging process of a fourth embodiment of the present disclosed example.
Figure 6:
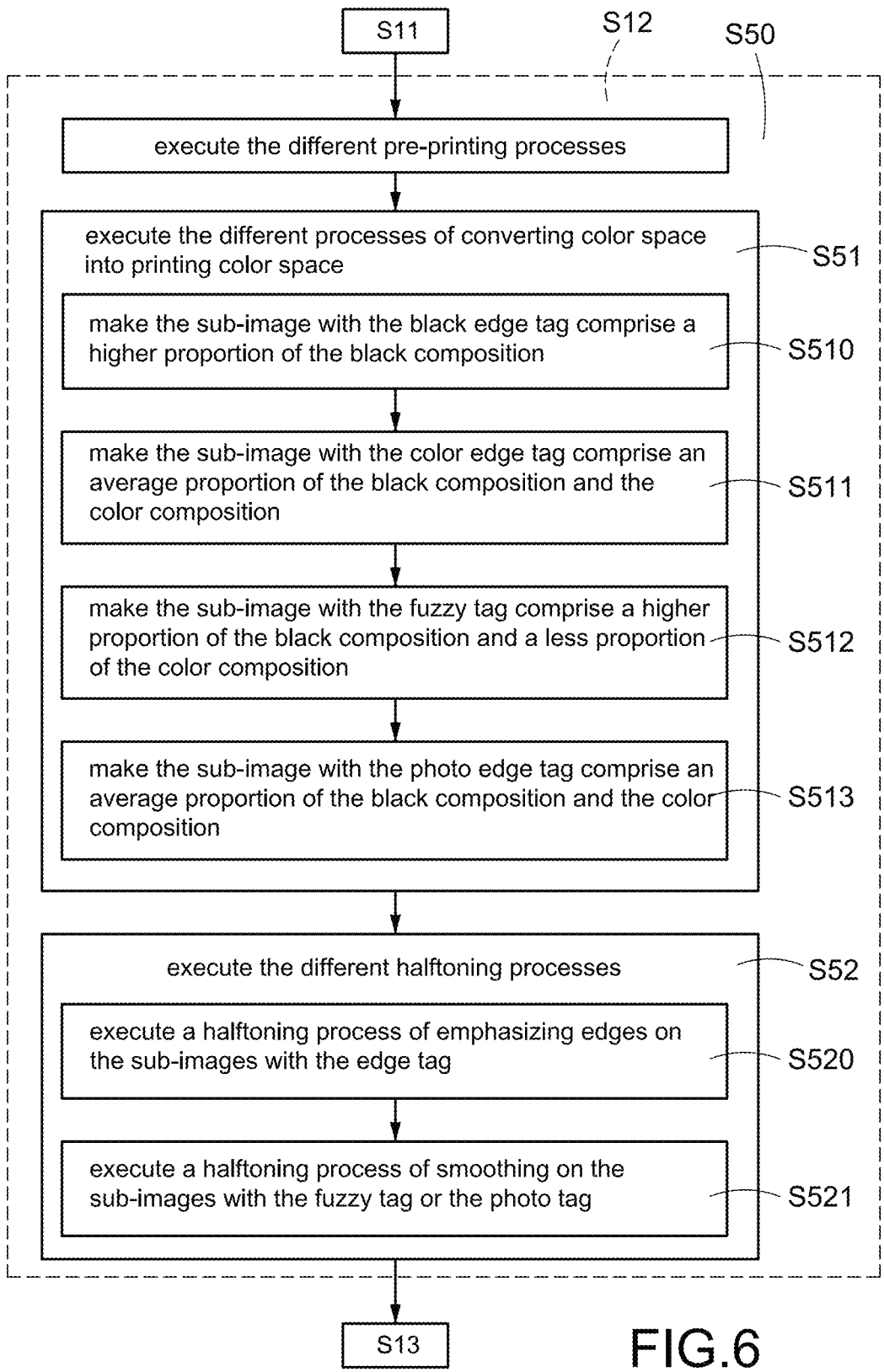
FIG. 6 is a flowchart of a printing converting process of a fifth embodiment of the present disclosed example.

Please refer to FIG. 1, FIG. 2 and FIG. 5 together, and FIG. 5 is a flowchart of a tagging process of a fourth embodiment of the present disclosed example. Like the embodiment shown in FIG. 4, the four tags are applied in this embodiment. It is different from the embodiment shown in FIG. 4 that this embodiment firstly determines which tag(s) is/are suitable to configure on each sub-image. Namely, the sub-image may be configured a plurality of tags simultaneously in the first of this embodiment. After the above determinations are finished, the printing apparatus 10 will select the most suitable one (based on the default value or user setting) from the tags as the final tag of the sub-image if any sub-image matches with a plurality of tags.

More specifically, in comparison with the more specifically shown in FIG. 2, in the step S11 of this embodiment, the processing module 100 performs the following steps S40-S46 on all of the sub-images of the input image, wherein the determinations of each tags are the same as or similar to the determinations of the embodiment shown in FIG. 4, only the difference will be described in the following description.

Step S40: the processing module 100 determines whether the sub-image belongs to black edge.

If the processing module 100 determines that the sub-image belongs to the black edge, the processing module 100 performs step S41. Otherwise, the processing module 100 performs step S42.

Step S41: the processing module 100 configures the black edge tag on the sub-image belonging to the black edge.

Step S42: the processing module 100 determines whether the sub-image belongs to the color edge.

If the processing module 100 determines that the sub-image belongs to the color edge, the processing module 100 performs step S43. Otherwise, the processing module 100 performs step S44.

Step S43: the processing module 100 configures the color edge tag on the sub-image belonging to the color edge.

Step S44: the processing module 100 determines whether the sub-image belongs the fuzzy region.

If the processing module 100 determines that the sub-image belongs to the fuzzy region, the processing module 100 performs step S45. Otherwise, the processing module 100 performs step S46.

Step S45: the processing module 100 configures the fuzzy tag on the sub-image belongs to the fuzzy region.

Step S46: the processing module 100 makes each of the sub-images be set only one tag.

More specifically, if any sub-image is set a plurality of tags simultaneously (namely, the sub-image simultaneously belongs to at least two of the black edge, the color edge, and the fuzzy region), the processing module 100 selects one of the tags configured on the sub-image simultaneously as the final and unique tag of the sub-image.

If there is any sub-image without any tag (namely the sub-image belongs to none of the black edge, the color edge, and the fuzzy region), the processing module 100 sets a default tag on the sub-image, such as photo tag.

One of the exemplary embodiments, the determination condition of the black edge is "the sub-image having a bias dark in brightness, a bias gray in color density, a bright spot, and a high sharpness edge", the determination condition of the color edge is "having a bias dark in brightness and a high sharpness edge", and the determination condition of the fuzzy region is "having a bias dark in brightness, a bias gray in color density, and a middle sharpness edge".

One of the exemplary embodiments, the processing module 100 is configured to select the tag with the highest priority based on the default priority order as the final tag of the sub-image.

One of the exemplary embodiments, the above-mentioned default priority order from high to low may be the black edge tag, the color edge tag and the fuzzy tag.

Thus, the present disclosed example can fully consider the possible types of each sub-image, and select the most suitable tag for the sub-image.

Please refer to FIG. 7 to FIG. 9 together, FIG. 7 is a first schematic view of a tagging process of one embodiment of the present disclosed example, FIG. 8 is a second schematic view of a tagging process of one embodiment of the present disclosed example, and FIG. 9 is a third schematic view of a tagging process of one embodiment of the present disclosed example. FIG. 7 to FIG. 9 are used to exemplarily explain the above-mentioned tagging process.

In this example, the input image is an image with size 8×8. For easy to explain, FIG. 7 shows the number of each pixel. Each grid in FIG. 8 shows the tag set after the preliminary decision of each sub-image, "0" represents the black edge tag, "1" represents the color edge tag, "2" represents the fuzzy tag, and "3" represents the photo tag. Each grid in FIG. 9 shows the tag set after the final decision of each sub-image.

In this example, the sub-image may be the single-point pixel (such as the pixel "3" or the pixel "9"), or an image block composed with a plurality of pixels (such as the sub-image 72 composed with the pixels 43-44).

One of the exemplary embodiments, the tagging process of the present disclosed example is executed to set a reference range of each of the sub-images by expanding outward from each of the sub-images as a center for a designated number of pixels, and determine the tag of each of the sub-images based on the pixels of each of the sub-images within the reference range.

Taking pixel "9" being a sub-image for example, its reference range is to expand outward horizontally and vertically for the distance of one pixel. The tag of the pixel "9" being a sub-image may be set as 0 (black edge tag) after execution comprehensive analysis based on a plurality of pixels 0-2, 8-10 and 16-18 in the reference range 70.

Taking pixel "3" for example, its reference range 71 is obtained by expanding outward horizontally for the distance of one pixel and expanding outward down for the distance of one pixel. The tag of the pixel "3" being a sub-image may be set as 0 (black edge tag) after execution comprehensive analysis based on a plurality of pixels 2-4 and 10-12 in the reference range 71.

Taking sub-image 72 composing with the pixel "43" and "44" for example, its reference range is to expand outward horizontally for the distance of two pixels and vertically for the distance of one pixel. It is determined that the tag of the sub-image 72 is non-tag status because the sub-image 72 belongs to none of the tag 1, tag 2 and tag 3 after execution comprehensive analysis based on a plurality of pixels 33-38, 41-46 and 49-54 in the reference range 73.

Thus, the present disclosed example can set the tags of all of the sub-images shown in FIG. 8.

Please be noted that, as shown in FIG. 8, each of the pixels 16 and 24 respectively being a sub-images is set a plurality of tags 0 and 1, each of the pixels 34-39 respectively being a sub-images is set a plurality of tags 1 and 2, and each of the pixels 41-47 respectively being a sub-images is set none of tags.

To this status, the present disclosed example is to make each of the pixels 16, 24, 34-39 respectively being a sub-image be with only the single tag by performing the above-mentioned step S46.

More specifically, as shown in FIG. 9, the present disclosed example may be configured to determine that the final tag of each of the pixels 16 and 24 (namely, the sub-images being set a plurality of tags "0" and "1") is "0" (the black edge tag), the final tag of each of the pixels 34-39 (namely, the sub-images being set a plurality of tags "1" and "2") is "1" (the color edge tag), and the final tag of each of the pixels 41-47 (namely, the sub-images being set none of the tags) is "3" (the photo tag).

Thus, the present disclosed example can make each sub-image only have the single tag.

Please refer to FIG. 1, FIG. 2, and FIG. 4 to FIG. 6, and FIG. 6 is a flowchart of a printing converting process of a fifth embodiment of the present disclosed example. More specifically, in comparison with the method of optimizing printing shown in FIG. 2, the step S12 of this embodiment comprises following steps.

Step S50: the processing module 100 selects one of the different processing parameter sets based on the tag of each sub-image, and executes a pre-printing process on each sub-image based on the selected processing parameter set.

One of the exemplary embodiments, the above-mentioned pre-printing processes may comprise at least one of the high-pass filtering process, the low-pass filtering process, and the band-pass filtering process. The above-mentioned processing parameter set comprises the filter parameters.

Taking executing the same type of filtering processes (such as low-pass filtering) for example, the above-mentioned tags respectively correspond to the different low-pass filtering parameters (namely, the processing parameter set), and the processing module 100 is configured to select low-pass filtering parameter corresponding to the tag of each sub-image, and execute the filtering process on the sub-image based on the selected low-pass filtering parameter.

Taking executing the different types of filtering processes for example, the above-mentioned tags respectively correspond to the different types of filtering parameters (namely, the processing parameter set), and the processing module 100 is configured to select filtering parameter corresponding to the tag of each sub-image, and execute the filtering process on the sub-image based on the selected filtering parameter, such as one of the high-pass filtering process, the low-pass filtering process, and the band-pass filtering process.

Please be noted that although above embodiment only takes the pre-printing processes being the filtering processes for example, the person skilled in the art of the present disclosed example can replace the above-mentioned pre-printing processes with any process of the related art after referring to the disclosure of the present disclosed example.

Step S51: the processing module 100 selects one of a plurality of different converting parameter sets for each sub-image respectively based on the tag of each sub-image, and executes a process of converting color space into printing color space on each sub-image based on the converting parameter set corresponding to each sub-image for obtaining a printing image of printing color space. Namely, transformer the color space of the tagged input image into the printing color space. The above-mentioned printing color space corresponds to the primary color(s) of the print materials 11.

One of the exemplary embodiments, the printing image comprises a block image and at least one primary color image.

One of the exemplary embodiments, the above-mentioned printing color space is the CMYK color space, and the printing image comprises a black image and three primary color images, such as a cyan primary color image, a magenta primary color image, and a primary color halftone image.

One of the exemplary embodiments, the processing module 100 may execute the following steps S510-S513 to adjust the black composition and the color composition of each sub-image based on the different types of tags. Namely, the processing module 100 adjusts a ratio of the black composition to the primary color composition.

Furthermore, in this embodiment, the processing module 100 may execute the process of converting color space into printing color space by using the different parameters based on the different types of tags for achieving the purpose of adjusting the ratio(s) of black to primary(s).

Step S510: the processing module 100 selects the black edge parameter to execute the process of converting color space into printing color space on the sub-image(s) being set the black edge tag of the input image for obtaining the sub-image(s) comprising a higher proportion of the black composition. Step S511: the processing module 100 selects the color edge parameter to execute the process of converting color space into printing color space on the sub-image(s) being set the color edge tag of the input image for obtaining the sub-image(s) comprising an average proportion of the black composition and color composition. Step S512: the processing module 100 selects the fuzzy parameter to execute the process of converting color space into printing color space on the sub-image(s) being set the fuzzy tag of the input image for obtaining the sub-image(s) comprising a higher proportion of the black composition and a less proportion of the color composition.

Step S513: the processing module 100 selects the photo parameter to execute the process of converting color space into printing color space on the sub-image(s) being set the photo tag of the input image for obtaining the sub-image(s) comprising an average proportion of the black composition and color composition.

Thus, the present disclosed example can make the proportions of the black composition and color composition of the sub-images of the printing image be the different based on their types, and clearly show the content of each sub-image.

Please be noted that the person skilled in the art of the present disclosed example may arbitrarily modify the above-mentioned proportion of the black composition and color composition after referring to the present disclosed example.

Thus, the processing module 100 performs step S52: the processing module 100 selecting one of the different halftoning processes based on the tag of each sub-image, and executing the selected halftoning process on each of the sub-images for transforming each sub-image into each printable sub-image and then obtaining the printable image composed with the printable sub-images.

One of the exemplary embodiments, the printable image is halftone image and comprises a black halftone image and at least one primary color image (such as a cyan halftone image, a magenta halftone image, and/or a yellow halftone image). Each halftone image is obtained by executing the halftoning process on the corresponding black or primary color image of the printing image.

One of the exemplary embodiments, the processing module 100 can execute following steps S520-S521 to execute the different halftoning processes respectively on the sub-images with the different tags.

Step S520: the processing module 100 executes a halftoning process of emphasizing edges on the sub-images with the edge tag (such as the black edge tag and/or the color edge tag) of the printing image for obtaining the printable sub-image of the printable image being sharpened.

Step S521 the processing module 100 executes a halftoning process of smoothing on each sub-image with the fuzzy tag or the photo tag of the printing image for obtaining the printable sub-image being smooth of the printable image.

One of the exemplary embodiments, the above-mentioned halftoning processes comprises the error diffusion and the ordered dithering.

One of the exemplary embodiments, the above-mentioned halftoning process of emphasizing edges is the error diffusion, and the above-mentioned halftoning process of smoothing is the ordered dithering.

Please be noted that more high-frequency information (image details) can be kept in the halftone image generated by the error diffusion keep, and the amplitude of image variation of the halftone image generated by the ordered dithering can be smoother.

One of the exemplary embodiments, the above-mentioned halftoning processes of emphasizing edges and the halftoning processes of smoothing can respectively be executed with the different masks.

Please be noted that although above description only takes two halftoning processing for example, the person skilled in the art of the present disclosed example may use the other halftoning processes based on his/her demand after reading the disclosure of the present disclosed example.

Then, the processing module 100 performs step S13. In the step S13 of this embodiment, and the printing module 101 of the printing apparatus 10 comprises a black printing unit and one or more primary color printing unit(s). The processing module 100 may control the black printing unit to print based on the black halftone image, and control the primary color printing unit to print based on the corresponding primary color halftone image.

One of the exemplary embodiments, the printing module 101 comprises the black printing unit, the cyan printing unit, a magenta printing unit and a yellow printing unit. The processing module 100 is configured to control the black printing unit to print based on the black halftone image, control the cyan printing unit to print based on the cyan halftone image, control the magenta printing unit to print based on the magenta halftone image, and control the yellow printing unit to print based on the yellow halftone image. Thus, the full-color printing can be implemented by the present disclosed example.

Figure 14:
FIG. 14 is a schematic view of an input image as another example.
Figure 15:
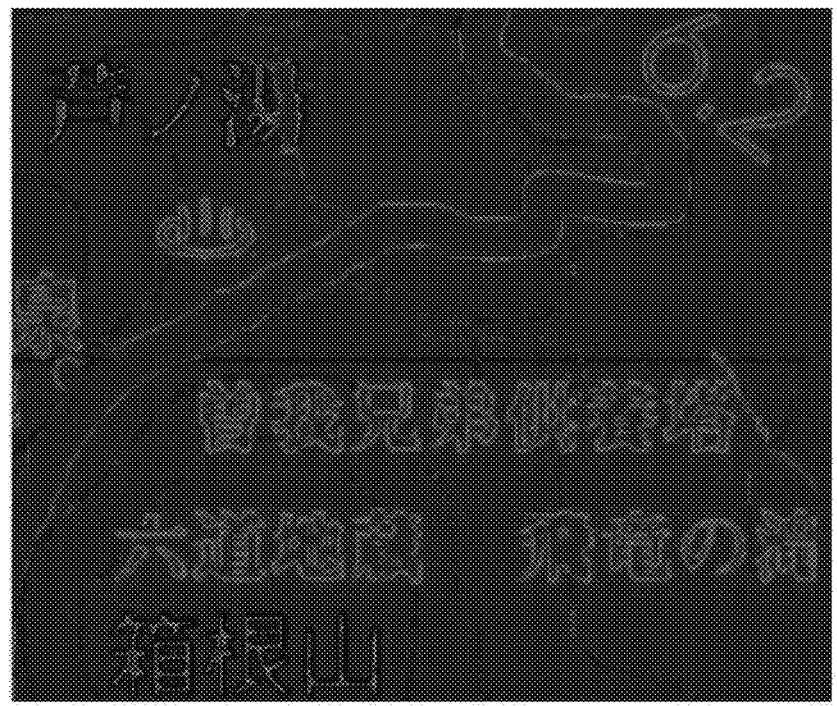
FIG. 15 is a schematic view of a result of executing a tagging process on FIG. 14 and marking according to the tag types.
Figure 16:
FIG. 16 is a schematic view of a result of processing on FIG. 14 by a method of optimizing printing of one embodiment of the present disclosed example.

Please refer to FIG. 14 to FIG. 16, FIG. 14 is a schematic view of an input image (RGB color image) as another example, FIG. 15 is a schematic view of a result of executing a tagging process on FIG. 14 and marking according to the tag types, and FIG. 16 is a schematic view of a result of processing on FIG. 14 by a method of optimizing printing of one embodiment of the present disclosed example.

In FIG. 15, the sub-images with the black edge tag are indicated in black, the sub-images with the color edge tag are indicated in red, the sub-images with the fuzzy tag are indicated in green, and the sub-images with the photo tag are indicated in blue.

FIG. 16 is clearly shown that after the process provided by the present disclosed example, the contours of the object in the image become deeper, and the smooth regions become soft. Thus, the present disclosed example really improves the print quality.

The above-mentioned are only preferred specific examples in the present disclosed example, and are not thence restrictive to the scope of claims of the present disclosed example. Therefore, those who apply equivalent changes incorporating contents from the present disclosed example are included in the scope of this application, as stated herein.

What is claimed is:

1. A method of optimizing printing, comprising:
   a) retrieving an input image;
   b) executing a tagging process on the input image for setting a tag on each sub-image of the input image, wherein the tagging process is used to set a black edge tag on the sub-image belonging to a black edge image, set a color edge tag on the sub-image belonging to a color edge image, set a fuzzy tag on the sub-image belonging to a fuzzy region, and set a photo tag on the sub-image belonging to a photo region;
   c) executing a plurality of different printing converting processes on the sub-images based on the tag of each of the sub-images for converting the input image into a printable image, wherein the printing converting processes comprises a converting process of emphasizing edges for each sub-image with the black edge tag or the color edge tag, a fuzzy converting process for each sub-image with the fuzzy tag, and a converting process of smoothing for each sub-image with the photo tag; and
   d) controlling a printing apparatus to print based on the printable image;
   wherein the tagging process comprises following steps:
   e1) determining that the sub-image belongs to the black edge when any of the sub-images of the input image has a bias dark in brightness, a bias gray in color density, a bright spot, and a high sharpness edge, and setting the black edge tag on the sub-image belonging to the black edge;
   e2) determining that the sub-image belongs to the color edge when any of the sub-images of input image has the bias dark in brightness and the high sharpness edge, and setting the color edge tag on the sub-image belonging to the color edge;
   e3) determining that the sub-image belongs to the fuzzy region when any of the sub-images of input image has the bias dark in brightness, the bias gray in color density, and a middle sharpness edge, and setting the fuzzy tag on the sub-image belonging to the fuzzy region; and
   e4) determining that the sub-image belongs to the photo region when any of the sub-images of input image does not belong to any of the black edge, the color edge, and the fuzzy region, and setting the photo tag on the sub-image belonging to the photo region.

2. The method of optimizing printing according to claim 1, further comprising following steps performed before the step a):
   f1) retrieving a scanning image of RGB color space by a scanning module; and
   f2) converting the scanning image into the input image of YCrCb color space.

3. The method of optimizing printing according to claim 1, wherein the tagging process is executed to set a reference range of each of the sub-images by expanding outward from each of the sub-images as a center for a designated number of pixels, and determine the tag of each of the sub-images based on the pixels of each of the sub-images within the reference range.

4. The method of optimizing printing according to claim 1, wherein each of the sub-images is the single pixel.

5. The method of optimizing printing according to claim 1, wherein the tagging process further comprises a step f5) when more than one tags are simultaneously tagged on any of the sub-images of the input image, selecting one with the highest priority from the tags being configured on the sub-image based on priorities of the black edge tag, the color tag, and the fuzzy tag, and configuring the tag being selected as the final only tag of the sub-image;
   the step e4) is performed to configure the photo tag on the sub-image without any of the black edge tag, the color tag, and the fuzzy tag.

6. The method of optimizing printing according to claim 1, wherein the step c) comprises following steps of:
   c1) selecting one of a plurality of different converting parameter sets for each sub-image respectively based on the tag of each sub-image, executing a process of converting color space into printing color space on each sub-image of the input image based on the converting parameter set corresponding to each sub-image for obtaining a printing image of printing color space, wherein the printing image comprises a black image and at least one primary color image; and
   c2) executing a plurality of different halftoning processes respectively on a plurality of sub-images of the printing image respectively corresponding to the sub-images of the input image based on the tags of the sub-images for obtaining the printable image, wherein the printable image comprises a black halftone image and at least one primary color halftone image.

7. The method of optimizing printing according to claim 6, wherein the step c) comprises a step c3) performed before the step c1) selecting one of a plurality of processing parameter sets based on the tag of each sub-image and executing a pre-printing process on each sub-image of the input image based on the processing parameter set being selected.

8. The method of optimizing printing according to claim 7, wherein the pre-printing process comprises high-pass filtering process, low-pass filtering process or band-pass filtering process.

9. The method of optimizing printing according to claim 6, wherein the step c1) comprises following steps:

c11) selecting a black edge parameter and executing the process of converting color space into printing color space on each sub-image of the input image with the black edge tag based on the black edge parameter for obtaining the sub-image of the printing image, wherein the sub-image being obtained comprises a higher proportion of black composition of the printing image;
   c12) selecting a color edge parameter and executing the process of converting color space into printing color space on each sub-image of the input image with the color edge tag based on the color edge parameter for obtaining the sub-image of the printing image, wherein the sub-image being obtained comprises an average proportion of the black composition and color composition;
   c13) selecting a fuzzy parameter and executing the process of converting color space into printing color space on each sub-image of the input image with the fuzzy tag based on the fuzzy parameter for obtaining the sub-image of the printing image, wherein the sub-image being obtained comprises a higher proportion of the black composition and a less proportion of the color composition; and
   c14) selecting a photo parameter and executing the process of converting color space into printing color space on each sub-image of the input image with the photo tag based on the photo parameter for obtaining the sub-image of the printing image, wherein the sub-image being obtained comprises an average proportion of the black composition and the color composition.

10. The method of optimizing printing according to claim 6, wherein the step c2) comprises following steps:
    c21) executing a halftoning process of emphasizing edges on each sub-image with the black edge tag or the color edge tag of the printing image for obtaining the sub-image being sharpened of the printable image; and
    c22) executing a halftoning process of smoothing on each sub-image with the fuzzy tag or the photo tag of the printing image for obtaining the sub-image being smooth of the printable image.

11. The method of optimizing printing according to claim 6, wherein the step d) comprises a step d1) controlling a black printing unit of the printing apparatus to print based on the black halftone image, and controlling at least one primary color printing unit of the printing apparatus to print based on the at least one primary color halftone image.

12. The method of optimizing printing according to claim 11, wherein the at least one primary color image comprises a cyan halftone image, a magenta halftone image, and a yellow halftone image;
    the step d1) is performed to control the black printing unit to print based on the black halftone image, control a cyan printing unit of the printing apparatus to print based on the cyan halftone image, control a magenta printing unit of the printing apparatus to print based on the magenta halftone image, and control a yellow printing unit of the printing apparatus of the printing apparatus to print based on the yellow halftone image.

* * * * *